April 19, 1966 W. W. FUNK ETAL 3,246,846

SPRAYING MACHINE

Filed Nov. 27, 1963 6 Sheets-Sheet 1

INVENTORS
WELKER W. FUNK
HARRY M. MEINERT
BY John C. Thompson
ATTORNEY

April 19, 1966 W. W. FUNK ETAL 3,246,846

SPRAYING MACHINE

Filed Nov. 27, 1963 6 Sheets-Sheet 2

*INVENTORS.*
WELKER W. FUNK
HARRY M. MEINERT

BY

ATTORNEY

INVENTORS.
WELKER W. FUNK
HARRY M. MEINERT
BY John C. Thompson
ATTORNEY

INVENTORS.
WELKER W. FUNK
HARRY M. MEINERT
BY
John C. Thompson
ATTORNEY

April 19, 1966 W. W. FUNK ETAL 3,246,846

SPRAYING MACHINE

Filed Nov. 27, 1963 6 Sheets-Sheet 5

INVENTORS.
WELKER W. FUNK
HARRY M. MEINERT
BY
John C. Thompson
ATTORNEY

SPRAYING MACHINE

INVENTORS.
WELKER W. FUNK
HARRY M. MEINERT
BY
[signature]
ATTORNEY

United States Patent Office 3,246,846
Patented Apr. 19, 1966

3,246,846

SPRAYING MACHINE

Welker W. Funk, Moline, and Harry M. Meinert, East Moline, Ill., assignors to Deere & Company, Moline, Ill., a corporation of Delaware Filed Nov. 27, 1963, Ser. No. 326,476
7 Claims. (Cl. 239—78)

The present invention relates to apparatus for distributing pesticides and other agricultural chemicals wherein the chemical material is entrained in a controlled air blast for subsequent deposition on plants, such as trees, bushes, and the like.

An object of the present invention is to provide apparatus for controlling an air blast in which chemical material is entrained to secure better penetration of the plants to be treated by the air blast, and also to achieve more even deposition of the chemical upon plant foliage.

To this end it is an object of the present invention to provide apparatus for generating an air blast which extends perpendicularly of the normal path of travel of the apparatus, to divide a lower portion of the air blast into differently angled streams which are adapted to contact a plant in such a manner that the foliage is forced open, and to direct the upper portion of the air blast into the opened foliage.

More particularly, it is an object of the present invention to provide apparatus to create an air blast which extends perpendicularly to the direction of travel of a mobile agricultural chemical distributor, to entrain chemical material within the air blast, to divide the lower portion of the air blast into two fixed streams, one of the streams extending forwardly and outwardly of the distributor, and the other stream extending rearwardly and outwardly of the distributor, and to oscillate the upper portion of the air blast whereby the last-mentioned portion of the air blast is alternately directed upwardly and downwardly, the upper portion entering between the divided lower portion of the air blast when directed downwardly.

Another object of the present invention is to provide improved apparatus for oscillating a portion of the air blast.

Another object of the present invention is to provide an improved oscillatable vane structue in which novel mounting means is provided for adjusting individual vanes.

A still further object of the present invention is to provide a fixed diverter vane assembly for dividing the lower portion of the air stream into two differently angled streams in which individual horizontal vanes may be adjustably positioned.

These and other objects and advantages of this invention will be apparent to those skilled in the art after a consideration of the following detailed description, taken in conjunction with the accompanying drawings, in which the preferred form of this invention is illustrated.

Figure 3:
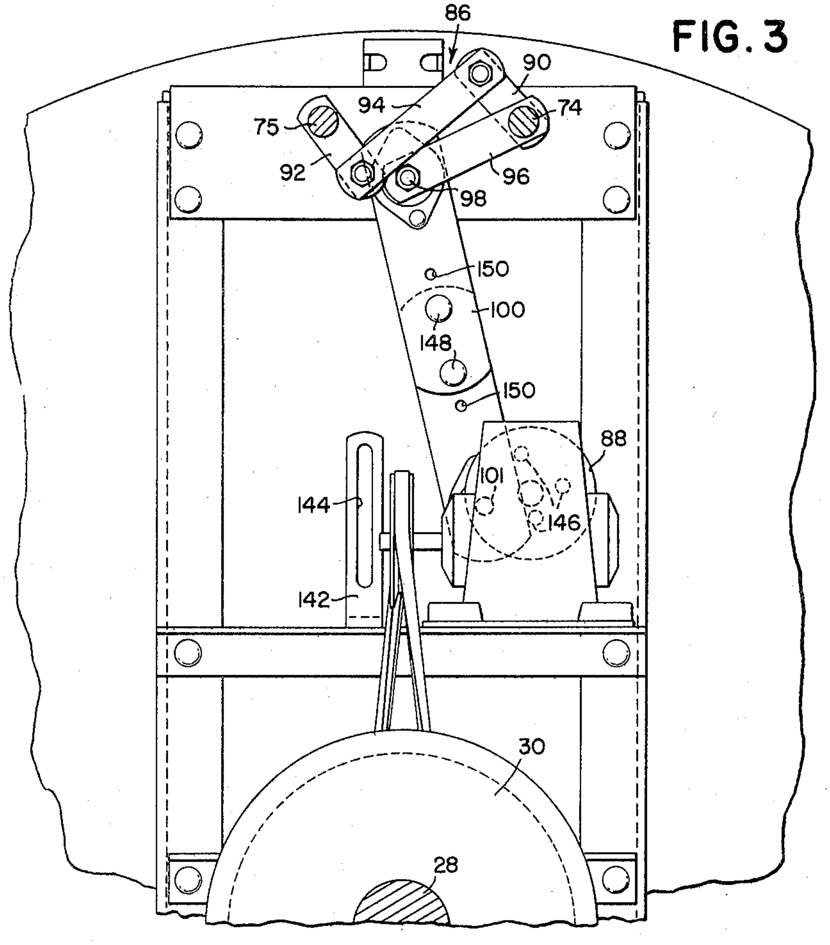
FIG. 3 is an end view of the oscillating mechanism shown in FIG. 2.
Figure 3A:
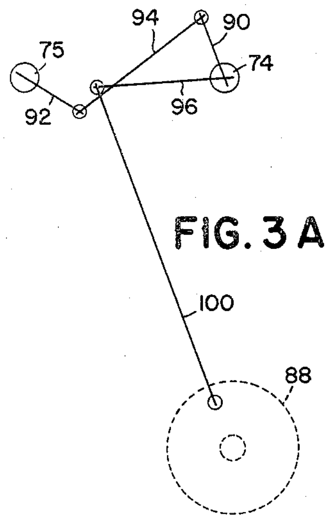
Figure 3B:
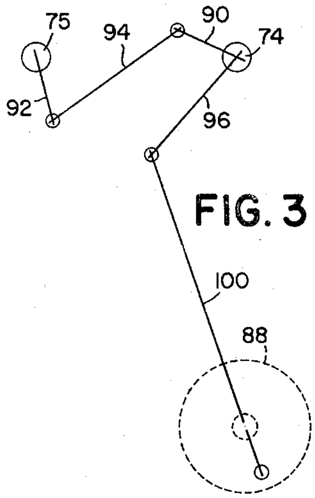

FIGS. 3*a* and 3*b* are schematic illustrations of the oscillating mechanism shown in FIG. 3 in its two extreme ranges of position.

Figure 1:
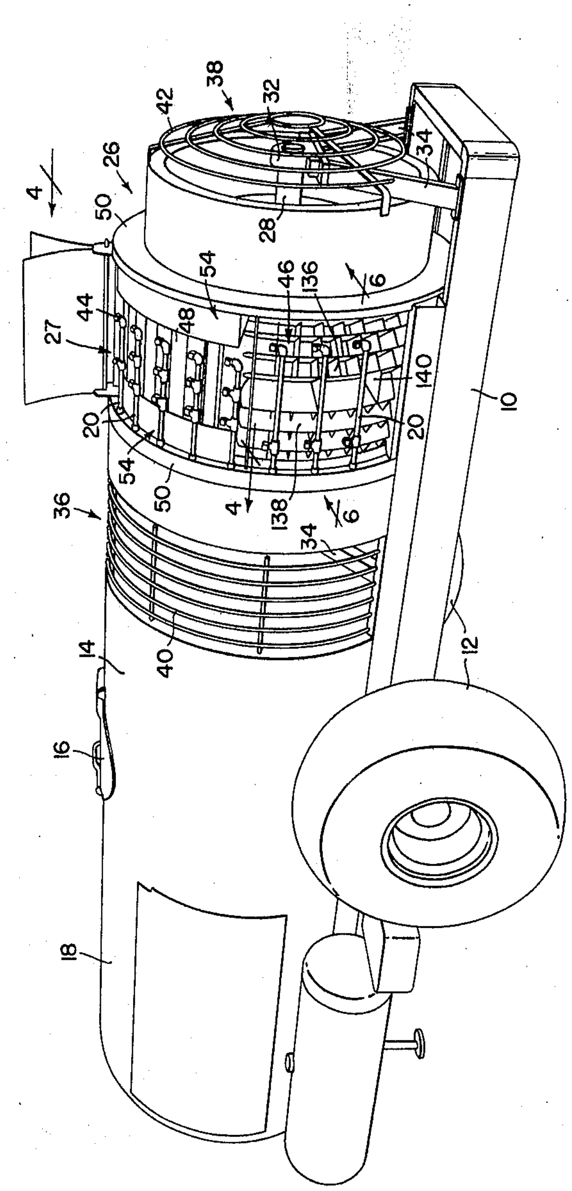
FIG. 1 is a perspective view of an air blast sprayer incorporating the novel principles of this invention.
Figure 4:
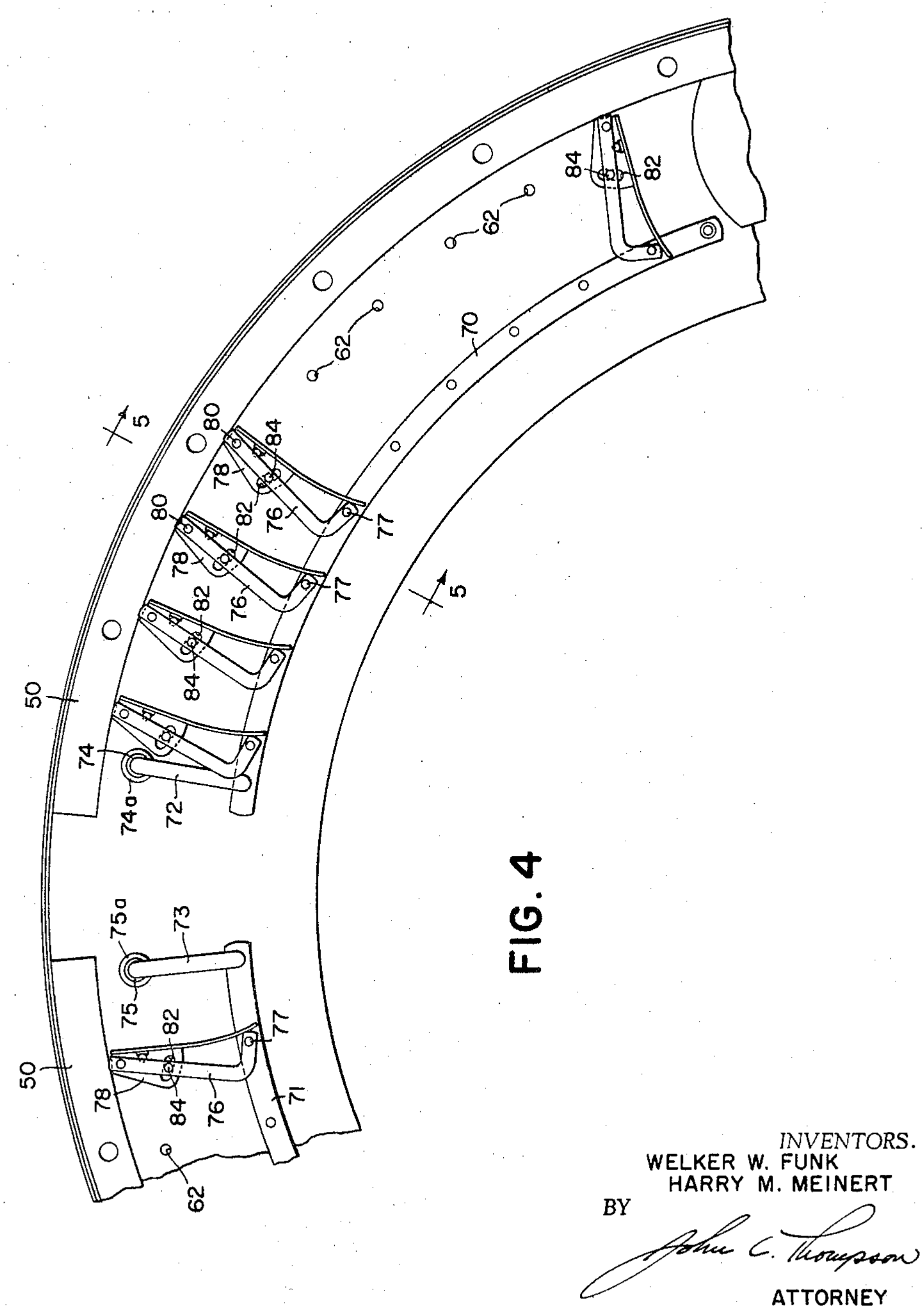

FIG. 4 is a sectional view taken along the line 4—4 of FIG. 1 showing the upper oscillatable vanes in the discharge housing, with some repetitive portions omitted.

Figures 5, 7:
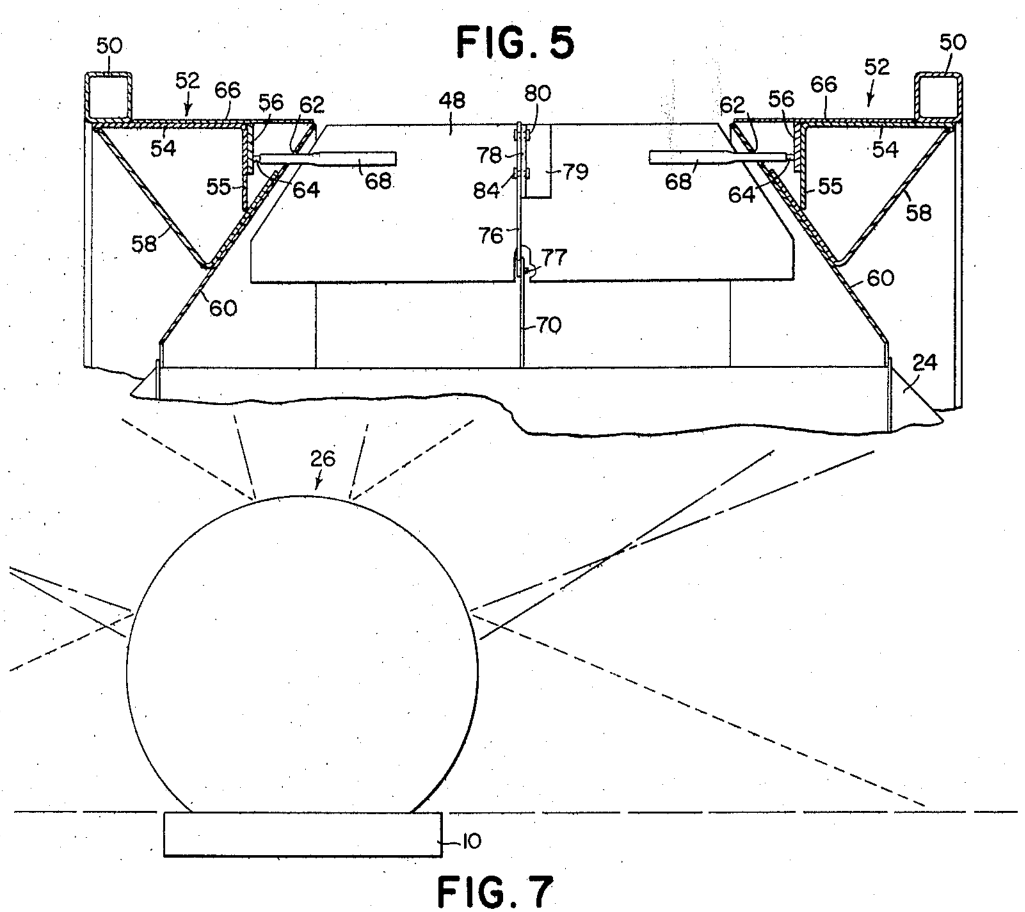

FIG. 5 is a view taken along the line 5—5 of FIG. 4 showing the manner in which the oscillatable vanes are pivotally secured to the discharge housing, the blower being omitted.

Figure 6:
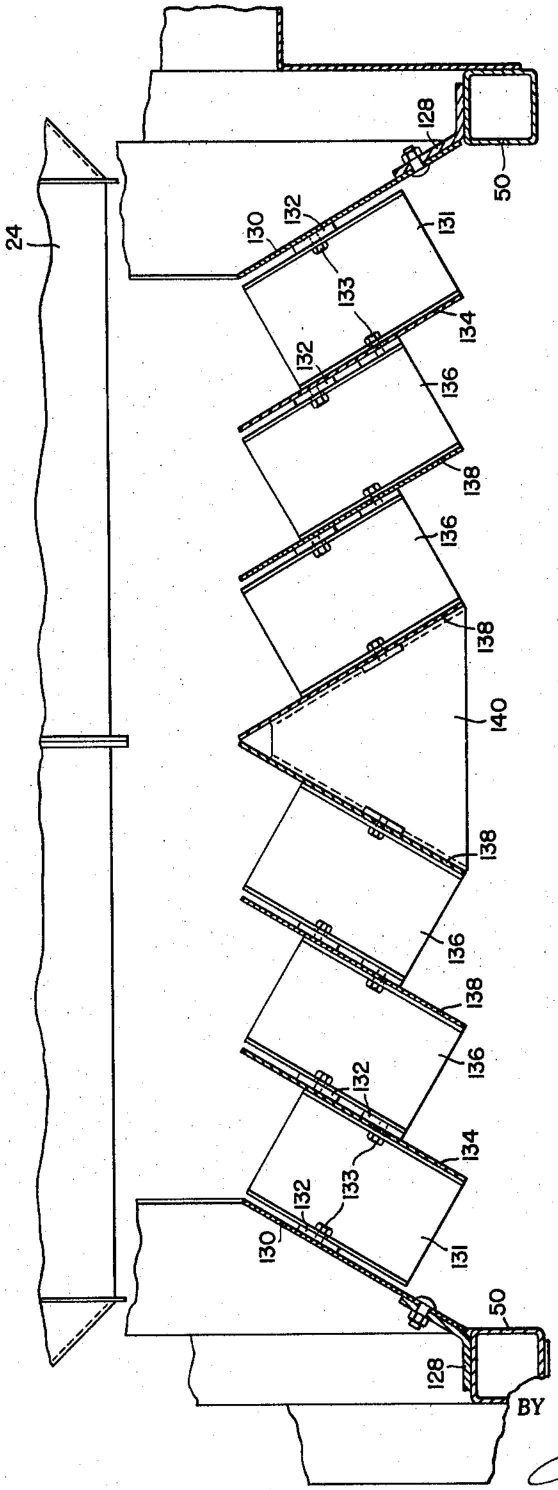

FIG. 6 is a view taken along the line 6—6 in FIG. 1 showing the fixed diverter vane assembly in the lower portion of the discharge head.

FIG. 7 is a schematic view taken from the rear of the spraying machine in which the upper portion of the air blast is shown in two extreme positions, the dotted lines showing the upper portion of the air blast when the upper portion is directed downwardly, and the dot-dash lines showing the upper portion of the air blast when the upper portion is directed upwardly, and the dash lines indicating the lower portion of the air blast.

Figure 8:
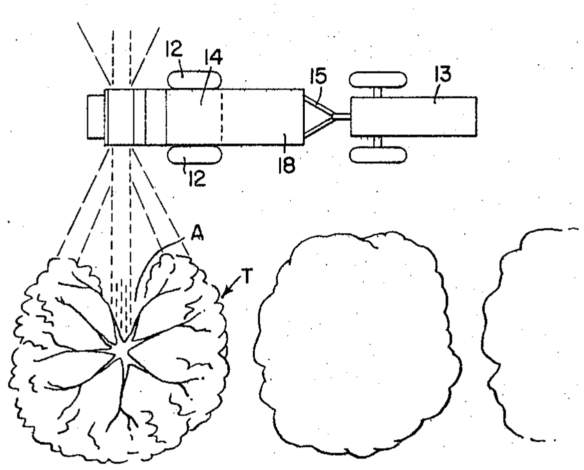

FIG. 8 is a schematic view showing how the foliage of a tree may be deflected by the diverging lower streams permitting the upper portion of the air blast to achieve better penetration.

In the following description right-hand and left-hand reference is determined by standing to the rear of the sprayer and facing the direction of travel.

Referring first to FIG. 1 in which a sprayer embodying the principles of the present invention are illustrated, the sprayer includes a chassis 10 supported by a pair of wheels 12 and adapted to be drawn through an orchard, orange grove, or the like by a tractor 13 (FIG. 8) hitched to a forwardly extending draft bar 15. Supported on the chassis 10 centrally of the machine is a tank 14 adapted to contain agricultural chemicals, which can include plant nutrients, stickers, fungicides and pesticides, the latter including herbicides and insecticides, the tank being adapted to be filled through the opening closed by a filler cap 16. An engine is mounted within an engine compartment 18 forwardly of the tank 14 and is adapted to drive a pump through suitable transmission means for pumping the spraying material from the tank 14 to the discharge pipes 20 at the rear of the machine. The engine is also connected through suitable transmission means including belts 22 (FIG. 2) to a blower fan 24 (FIG. 6) mounted within the discharge head, indicated generally at 26, the discharge head having an inlet opening 27.

The blower 24 is mounted on a blower shaft 28 to which is keyed the sheave 30 that receives the belts 22. The shaft 28 is supported on front and rear bearing blocks 32 (only the rear bearing block being shown) and the bearing blocks are in turn carried by suitable structure 34 on the chassis 10.

Mounted to the front and rear of the discharge head 26 are inlet areas 36 and 38 respectively. Disposed over the inlet areas are front and rear safety shields or screens 40 and 42, respectively.

The sprayer so far described is in many respects similar to the sprayer shown in Patent No. 2,676,057 to G. W. Daugherty issued April 20, 1954 and reference may be had thereto for a more complete description to this general class of sprayers. However, it should be noted that sprayers of this class are designed to be drawn through orchards and the like by tractors, as above referred to, and that the spray material contained within the tank 14 is caused to be discharged through the nozzles 44 on the discharge pipes 20 by means of the pump which is driven by the engine. As the spray material is being discharged, the fan or blower 24 is simultaneously driven from the engine and air drawn in through the inlet areas 36 and 38 is impelled through the outlet opening 27 in the discharge head 26, the spray material discharged through the nozzles 44 being entrained in the discharged air.

According to the principles of the present invention, the discharge head 26 is provided with novel means to control the discharged air, and these means include fixed fore-and-aft lower diverter vane assemblies indicated generally at 46, and upper oscillatable vanes 48. It should be noted that the outlet opening 27 of the discharge head extends from one side of the machine to the other, and that identical control means are provided at each side of the machine.

Disposed to the front and rear of the discharge head 26 are frame members 50 (FIG. 5), and secured to the upper portion of each frame member 50 is a shield and upper vane support structure, indicated generally at 52. Each shield and support structure includes pivot ring supports 54 which are secured to the associated frame member 50 in a conventional manner. The supports 54 are provided with inwardly directed flanges 55 to which are secured a pivot ring 56. An upper shield support 58 is secured to the pivot ring support 54 and the shield support 58 in turn carries the upper shield member 60. Each of the upper shield members is provided with a plurality of apertures 62, and pins 64 are disposed on the pivot ring 56 in alignment with the apertures 62. An upper shield cover 66 is disposed over the pivot ring support 54.

One end of each of the fore-and-aft extending tubular pivot members 68 is flattened and secured to the associated vane 48, the other end of each of the pivot members 68 extends through the associated aperture 62 and is disposed about the aligned pin 64.

The vanes 48 on the upper portion of the right- and left-hand sides of the sprayer are oscillated by means of right- and left-hand shifter rings or segments 70 and 71, respectively, FIG. 4, which are connected through right- and left-hand first rock arms 72 and 73, respectively, formed on the rear ends of right- and left-hand rockshafts 74, and 75, respectively, FIG. 3, the rockshafts being oscillated in a manner more fully set forth below. Each of the vanes 48 is connected to its associated shifter ring by means of a vane control link 76 which is pivotally secured at one end by means of a pivot pin 77, and each vane is pivotally connected at the other end to an upstanding flange 78 on a bracket 79 (FIG. 5), by means of a pivot pin 80. Each of the brackets being in turn welded or otherwise secured to the associated vane 48. The flange 78 is provided with a slot 82, and fastener means 84 in the form of a nut and bolt or similar device is adapted to secure the vane control link 76 to the flange 78 in adjustable position. Each vane may be individually adjusted with respect to the other vanes by loosening the fastener 84 and swinging the vane 48 to its desired position.

Figure 2:
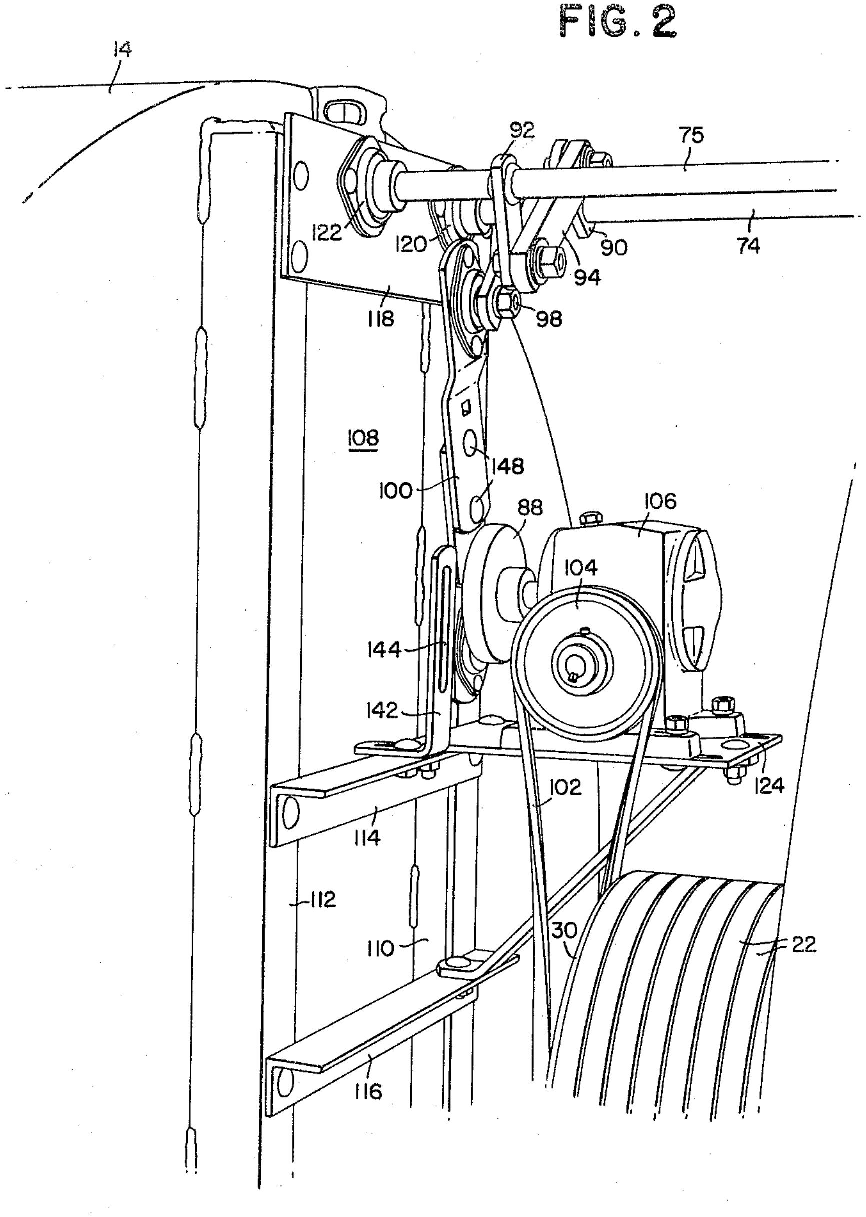
FIG. 2 is a perspective view of a portion of the apparatus employed to oscillate the upper vanes in the discharge housing of the air blast sprayer.

The vanes are caused to be oscillated, as mentioned above, by oscillation of the rock shafts 74 and 75. As best shown in FIGS. 2 and 3 the right- and left-hand rock shafts 74 and 75 are caused to be oscillated by linkage indicated generally at 86 which is connected to a crank or eccentric 88 which is in turn driven from the sprayer motor by suitable drive means. The linkage includes right- and left-hand second rock arms 90 and 92, respectively, extending outwardly from the right- and left-hand rockshafts 74 and 75, to which they are rigidly secured, the right-hand second rock arm 90 extending upwardly and the left-hand second rock arm 92 extending downwardly, the arms 90 and 92 being interconnected by suitable strap means 94. Extending downwardly from the right-hand rockshaft 74 is a third rock arm 96 which is connected through a pivot pin 98 to a two-piece link 100 which is pivotally connected at its lower end to the crank wheel or eccentric 88 by pin means 101 (FIG. 3).

The crank 88 is adapted to be driven from the sprayer motor by suitable drive means which includes a belt 102 disposed over a sheave 104 which drives a speed reducer 106 which in turn drives the crank wheel or eccentric 88. The speed reducer is mounted within the front inlet area 36 and is secured to the rear wall 108 of the tank 14 by means of suitable support means which includes right- and left-hand angles 110 and 112 respectively, which are welded to the rear wall, transverse upper and lower angles 114 and 116 respectively, and a horizontal mounting plate 124 which extends rearwardly from the upper transverse angle iron 114, the rear end of the plate being supported on the lower transverse angle iron 116 by a strap 126.

An upper transverse bearing plate 118 is secured to the angles 110 and 112, the plate 118 carrying right- and left-hand bearings 120 and 122, each of which receives one end of the associated right- and left-hand rockshafts 74 and 75. A rear portion of each of the rockshafts 74 and 75 is supported in an associated bearing 74*a*, 75*a* (FIG. 4), carried by the forward support and shield structure.

Mounted within the outlet opening 27 on each side of the lower portion of the discharge head is a fixed diverter vane assembly (FIG. 6). The vane assembly is secured to the frame members 50 of the discharge head by means of clips 128 which carry front and rear vertical vanes 130. A plurality of horizontal vanes 131 is secured by means of weld nuts 132 and cap screws 133 to the front and rear vertical vanes 130. Inner vertical vanes 134 are secured to the inner sides of the horizontal vanes 131 also by means of weld nuts and cap screws. Further horizontal vanes 136 and vertical vanes 138 are secured to each other in a similar manner and a horizontal center support 140 is employed to secure the innermost vertical vanes 138 together. The horizontal vanes may be adjusted angularly by loosening the cap screws 133 and moving the outer end up and down to the desired position and then tightening the cap screw.

The operation of applicant's device should be apparent from the foregoing description, however it should be noted that the blast of air generated by the blower 24 will be distributed radially through the outlet 27 and that the portion of the air blast which passes through the lowermost parts of the discharge head will encounter the fixed diverter vane assembly 46 and thus the lower portion of the air blast will be diverted into two streams, one stream of air extending forwardly and outwardly of the spraying machine, and the other blast of air extending outwardly and rearwardly of the machine as can best be seen from FIG. 8. That portion of the air blast which is impelled through the upper portion of the outlet 27 contacts the oscillatable vanes 48 and is swung upwardly and downwardly as schematically illustrated in FIG. 7. When the air stream is directed downwardly, as shown in FIGS. 7 and 8 the upper portion will pass between the lower diverted streams and thus introduce agricultural chemicals into that portion A of the tree or bush that has been opened up by the diverted streams.

In some instances it may be desirable to keep the upper vanes from oscillating and to this end a bracket 142 (FIGS. 2 and 3) is mounted on the upper transverse angle iron 114, the bracket 142 having a slot 144 to which the lower ends of the link 100 may be secured in an adjusted fixed position.

Also, the degree of oscillation may be varied by pivotally securing the lower portion of the link 100 to one of the radially inner holes 146 (FIG. 3) on the crank wheel 88, the degree of oscillation being reduced corresponding to the reduction in distance of the selected hole from the center of the crank wheel. A further adjustment is provided in that the link 100 may be shortened from the position shown, by repositioning the bolts 148 in such a manner that they pass through the holes 150, thus shortening the link 100.

While we have shown and described above the preferred structure in which the principles of the present invention have been incorporated, it is to be understood that our invention is not to be limited to the particular details, shown and described above, that, in fact, widely different means may be employed in the practice of the broader aspects of our invention.

We claim:

1. A mobile agricultural chemical distributor adapted for forward movement past plants to be treated comprising means for creating and discharging an air blast having an upper and lower portion in a plane extending transversely of the direction of travel of the sprayer, means connected to said air blast creating and discharging means for dividing the lower portion of the air blast into a first stream and a second stream, the first stream being forwardly angled and the second stream being rearwardly angled, means connected to said air blast creating and discharging means for repeatedly oscillating the upper portion of the air blast vertically through an arcuate path lying in said plane, and means associated with said air blast creating and discharging means for introducing agricultural chemicals into said air blast.

2. The invention set forth in claim 1 in which said means for repeatedly oscillating the upper portion of the air blast includes a plurality of parallel vanes pivotally mounted on the sprayer, shifter ring means carried by said bades, rockshaft means operatively connected to the air blast creating and discharge means, and rock arm means interconnecting said rockshaft means and said shifter ring means.

3. In a mobile sprayer adapted for movement past plants to be treated and including means for creating and discharging an air blast in a plane extending transversely of the direction of travel of the sprayer, said means including a housing, means associated with said air blast creating and discharging means for introducing agricultural chemicals into said air blast, and means connected to said air blast creating and discharging means for repeatedly oscillating a portion of the air blast vertically through an arcuate path lying in said plane, said last-mentioned means including a plurality of fore-and-aft extending oscillatable vanes, means pivotally supporting said vanes on said housing, a shifter ring means interconnecting said vanes and shiftable to pivot said vanes, and a rockshaft and first rock arm means drivingly connected with said shifter ring means and adapted to shift said ring means, the combination therewith of an eccentric drivingly interconnected with said air blast creating and discharging means, a link having one end secured to said eccentric and the other end connected with second rock arm means, said second rock arm means being mounted on said rockshaft and first rock arm means.

4. A mobile sprayer adapted for movement past plants to be treated comprising means for creating anl discharging an air blast in a plane extending transversely of the direction of travel of the sprayer, said means including a housing, means associated with said air blast creating and discharging means for introducing agricultural chemicals into said air blast, and means connected to said air blast creating and discharging means for repeatedly oscillating a portion of the air blast vertically through an arcuate path lying in said plane, said last-mentioned means including a plurality of fore-and-aft extending oscillatable vanes, link means associated with each of said vanes, means adjustably interconnecting said link means and said vanes means whereby the vanes may be individually angularly positioned with respect to said links, one of said vane and link means being pivotally secured to said housing, and means interconnecting said links and operable to oscillate said vanes.

5. A mobile sprayer adapted for movement past plants to be treated comprising means for creating and discharging an air blast in a plane extending transversely of the direction of travel of the sprayer, said means including a housing, means associated with said air blast creating a discharging means for introducing agricultural chemicals into said air blast, means connected to said housing for dividing at least a portion of the air blast into a first stream and a second stream, the first stream being forwardly angled and the second stream being rearwardly angled, said dividing means including a plurality of vertical vanes angularly disposed to said housing, and a plurality of horizontal vanes interconnecting said vertical vanes, said horizontal vanes being pivotally mounted on said vertical vanes.

6. The invention set forth in claim 3 in which said first link is extensible and retractable whereby the range of oscillatory movement of the vanes with respect to the housing may be varied.

7. A mobile agricultural chemical distributor adapted for forward movement past plants to be treated comprising means for creating and discharging an upper air blast in a plane extending transversely of the direction of travel of the sprayer, means connected to said upper air blast creating and discharging means for repeatedly oscillating the upper air blast upwardly and downwardly, means for creating first and second lower air blasts, the first lower air blast being forwardly angled and the second lower air blast being rearwardly angled, and means associated with all of said air blast creating and discharging means for introducing agricultural chemicals into said air blasts.

References Cited by the Examiner

UNITED STATES PATENTS

| | | | |
|---|---|---|---|
| 1,827,583 | 10/1931 | James | 239—8 |
| 2,331,107 | 10/1943 | Daugherty | 239—78 |
| 2,515,792 | 7/1950 | Ofeldt | 239—9 |
| 2,641,504 | 6/1953 | Robinson | 239—78 |
| 3,088,676 | 5/1963 | Nottingham | 239—78 |
| 3,097,794 | 7/1963 | Dawson | 239—78 |
| 3,151,812 | 10/1964 | Culp | 239—78 |

M. HENSON WOOD, Jr., *Primary Examiner.*

EVERETT W. KIRBY, *Examiner.*

D. L. MOSELEY, *Assistant Examiner.*